(12) United States Patent
Chinya et al.

(10) Patent No.: US 8,001,364 B2
(45) Date of Patent: *Aug. 16, 2011

(54) DYNAMICALLY MIGRATING CHANNELS

(75) Inventors: Gautham Chinya, Hillsboro, OR (US);
Robert Geva, Cupertino, CA (US);
Robert Knight, Mahomet, IL (US);
Hong Wang, Santa Clara, CA (US);
Xiang Zou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,918

(22) Filed: Oct. 23, 2009

(65) Prior Publication Data

US 2010/0042765 A1 Feb. 18, 2010

Related U.S. Application Data

(63) Continuation of application No. 11/241,198, filed on Sep. 30, 2005, now Pat. No. 7,631,125.

(51) Int. Cl.
| | |
|---|---|
| G06F 13/00 | (2006.01) |
| G06F 9/46 | (2006.01) |
| G06F 7/38 | (2006.01) |
| G06F 9/00 | (2006.01) |
| G06F 9/44 | (2006.01) |
| G06F 13/28 | (2006.01) |
| G06F 12/00 | (2006.01) |

(52) U.S. Cl. ........ 712/244; 710/104; 718/102; 712/227; 711/165; 711/154

(58) Field of Classification Search ............... 710/29, 710/104; 718/102; 712/227, 244; 711/165, 711/154
See application file for complete search history.

(56) References Cited

U.S. PATENT DOCUMENTS

| | | | | |
|---|---|---|---|---|
| 5,515,538 | A * | 5/1996 | Kleiman | 710/260 |
| 5,826,081 | A | 10/1998 | Zolnowsky | 718/103 |
| 6,233,599 | B1 | 5/2001 | Nation et al. | |
| 6,269,425 | B1 | 7/2001 | Mounes-Toussi et al. | 711/133 |
| 6,401,155 | B1 | 6/2002 | Saville et al. | 710/266 |
| 6,615,300 | B1 | 9/2003 | Banning et al. | 710/100 |
| 6,697,935 | B1 | 2/2004 | Borkenhagen et al. | 712/228 |
| 7,065,766 | B2 | 6/2006 | Brenner | 718/103 |
| 2003/0236815 | A1 | 12/2003 | Brenner et al. | |
| 2004/0163083 | A1 | 8/2004 | Wang et al. | 718/102 |
| 2005/0044319 | A1 | 2/2005 | Olukotun | 711/118 |
| 2005/0108711 | A1 | 5/2005 | Arnold et al. | 718/100 |

(Continued)

OTHER PUBLICATIONS

State Intellectual Property Office, P.R. China, Third Office Action dated Aug. 21, 2009, in a related application.

(Continued)

*Primary Examiner* — Alford W Kindred
*Assistant Examiner* — Farley Abad
(74) *Attorney, Agent, or Firm* — Trop, Pruner & Hu, P.C.

(57) ABSTRACT

In one embodiment, the present invention includes a method of determining a relative priority between a first agent and a second agent, and assigning the first agent to a first channel and the second agent to a second channel according to the relative priority. Depending on the currently programmed status of the channels, information stored in at least one of the channels may be dynamically migrated to another channel based on the assignments. Other embodiments are described and claimed.

19 Claims, 8 Drawing Sheets

U.S. PATENT DOCUMENTS

| | | | |
|---|---|---|---|
| 2005/0149697 A1 | 7/2005 | Enright et al. | 712/214 |
| 2006/0133352 A1 | 6/2006 | Chang | 370/352 |
| 2007/0055839 A1 | 3/2007 | Hanes et al. | 711/165 |

OTHER PUBLICATIONS

German Patent and Trademark Office, Office Action dated Mar. 5, 2009, in a related application.

U.S. Appl. No. 11/134,687, filed May 19, 2005, entitled "A Programmable Event Driven Yield Mechanism Which May Activate Service Threads" by Xiang Zou et al.

U.S. Appl. No. 11/240,703, filed Sep. 30, 2005, entitled "Profiling Using a User-Level Control Mechanism" by Robert Knight et al.

* cited by examiner

80

| Channel | Scenario |
|---|---|
| 0 | LFP-LLC Miss |
| 1 | |

82

| Channel | Scenario |
|---|---|
| 0 | LF-LLC Miss-LBR |
| 1 | LFP-LLC Miss |

| Channel | Scenario |
|---|---|
| 0 | |
| 1 | |
| 2 | LF-LLC Miss-LBR |
| 3 | IR-LBR |

50a → 0
50b → 1
50c → 2 — 55a
50d → 3 — 55b

86

| Channel | Scenario |
|---|---|
| 0 | |
| 1 | LF-LLC Miss-LBR |
| 2 | IR-LBR |
| 3 | LFP-LLC Miss |

DYNAMICALLY MIGRATING CHANNELS

This application is a continuation of U.S. patent application Ser. No. 11/241,198, filed Sep. 30, 2005, now U.S. Pat. No. 7,631,125 entitled "DYNAMICALLY MIGRATING CHANNELS," the content of which is hereby incorporated by reference.

BACKGROUND

Embodiments of the present invention relate to computer systems and more particularly to effective use of resources of such a system.

Computer systems execute various software programs using different hardware resources of the system, including a processor, memory and other such components. A processor itself includes various resources including one or more execution cores, cache memories, hardware registers, and the like. Certain processors also include hardware performance counters that are used to count events or actions occurring during program execution. For example, certain processors include counters for counting memory accesses, cache misses, instructions executed and the like. Additionally, performance monitors may also exist in software to monitor execution of one or more software programs.

Together, such counters and monitors can be used according to at least two usage models. First, they may be used during compilation and other optimization activities to improve code execution based upon profile information obtained during program execution. Second, upon occurrence of an event in a counter or monitor during program execution, one or more helper threads may be called. Such helper threads are software routines that are called by a calling program to improve execution, such as to prefetch data from memory or perform another such activity to improve program execution.

Oftentimes, these resources are used inefficiently, and furthermore use of such resources in the different usage models can conflict. A need thus exists for improved manners of obtaining and using monitors and performance information for use in these different usage models.

BRIEF DESCRIPTION OF THE DRAWINGS

FIG. 5 is an example channel allocation before and after dynamic channel migration in accordance with an embodiment of the present invention.

FIG. 6 is another example channel allocation before and after dynamic channel migration in accordance with an embodiment of the present invention.

DETAILED DESCRIPTION

Figure 1:
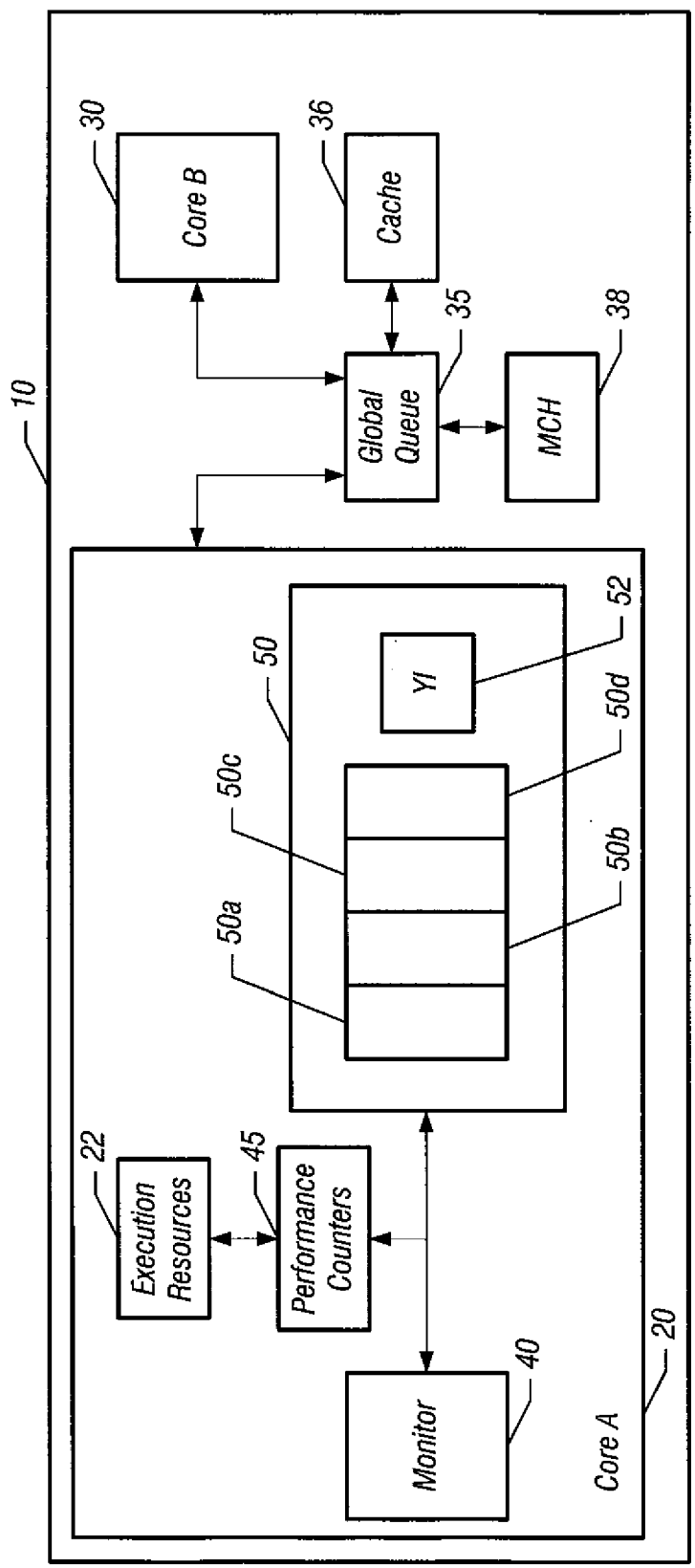
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may include various resources. In some embodiments, processor 10 may be a chip multiprocessor (CMP) or another multiprocessor unit. As shown in FIG. 1, a first core 20 and a second core 30 may be used to execute instructions of various software threads. Also shown in FIG. 1, first core 20 includes a monitor 40 that may be used to manage resources and control a plurality of channels 50a-50d of the core. First core 20 may further include execution resources 22 which may include, for example, a pipeline of the core and other execution units. First core 20 may further include a plurality of performance counters 45 coupled to execution resources 22, which may be used to count various actions or events within these resources. In such manner, performance counters 45 may detect particular conditions and/or counts and monitor various architectural and/or microarchitectural events. Performance counters 45 may be in communication with monitor 40 to provide, for example, count information thereto.

Monitor 40 may include various programmable logic, software and/or firmware to track activities in performance counters 45 and channels 50a-50d. Channels 50a-50d may be register-based storage media, in one embodiment. A channel is an architectural state that includes a specification and occurrence information for a scenario, as will be discussed below. In various embodiments, a core may include one or more channels. There may be one or more channels per software thread, and channels may be virtualized per software thread. Channels 50a-50d may be programmed by monitor 40 for various usage models, including profile-guided optimization (PGOs) or in connection with improved program performance via the use of helper threads or the like.

While shown as including four such channels in the embodiment of FIG. 1, it is to be understood that the scope of the present invention is not so limited and in other embodiments more or fewer such channels may be present. Further, while shown only in first core 20 for ease of illustration, channels may be present in multiple processor cores. A yield indicator 52 may be associated with channels 50a-50d. In various embodiments, yield indicator 52 may act as a lock to prevent occurrence of one or more yield events (to be discussed further below) while yield indicator 52 is in a set condition (for example).

Still referring to FIG. 1, processor 10 may include additional components, such as a global queue 35 coupled between first core 20 and second core 30. Global queue 35 may be used to provide various control functions for processor 10. For example, global queue 35 may include a snoop filter and other logic to handle interactions between multiple cores within processor 10. As further shown in FIG. 1, a cache memory 36 may act as a last level cache (LLC). Still further, processor 10 may include a memory controller hub (MCH) 38 to control interaction between processor 10 and a memory coupled thereto, such as a dynamic random access memory (DRAM) (not shown in FIG. 1). While shown with these limited components in FIG. 1, it is to be understood that in various embodiments processor 10 may include many other components and resources such as additional cache memories, standard register sets, input/output (I/O) interfaces and the like. Furthermore, it is to be understood that at least some of the components shown in FIG. 1 may include hardware or firmware resources or any combination of hardware, software and/or firmware.

Figure 2:
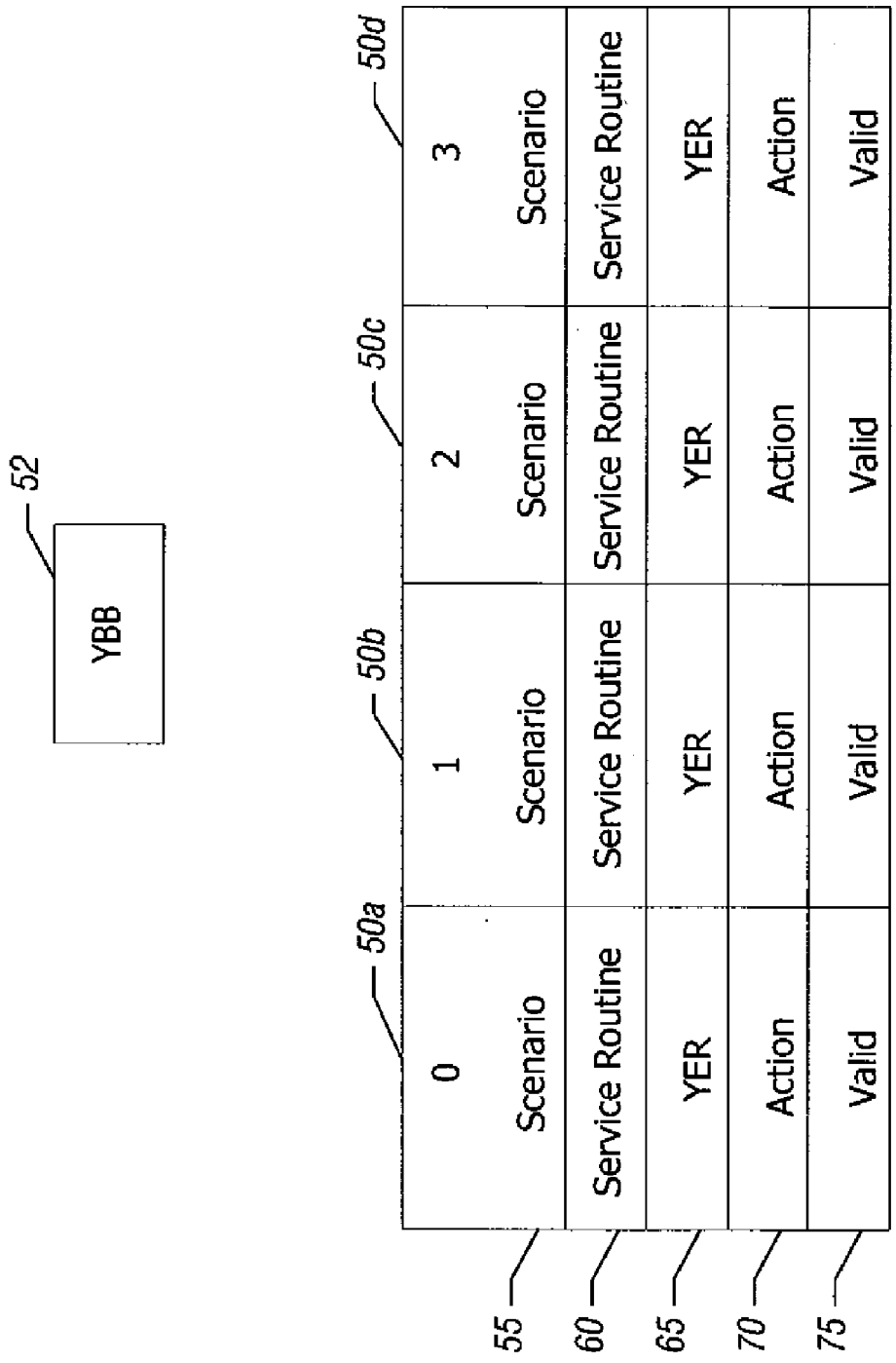
FIG. 2 is a block diagram of a hardware implementation of a plurality of channels in accordance with an embodiment of the present invention.

Referring now to FIG. 2, shown is a block diagram of a hardware implementation of a plurality of channels in accordance with an embodiment of the present invention. As shown in FIG. 2, channels 50a-50d may correspond to channels 0-3, respectively, as viewed by software. In the embodiment of FIG. 2, channel identifiers (IDs) 0-3 may identify a channel programmed with a specific scenario, and may correspond to a channel's relative priority. In various embodiments, the channel ID may also identify a sequence (i.e., priority) of service routine execution when multiple scenarios trigger on the same instruction, although the scope of the present invention is not so limited. As shown in FIG. 2, each channel, when programmed, includes a scenario segment 55, a service routine segment 60, a yield event request (YER) segment 65, an action segment 70, and a valid segment 75. While shown with this particular implementation in the embodiment of FIG. 2, it is to be understood that in other embodiments, additional or different information may be stored in programmed channels.

A scenario defines a composite condition. In other words, a scenario defines one or more performance events or conditions that may occur during execution of instructions in a processor. These events or conditions, which may be a single event or a set of events or conditions, may be architectural events, microarchitectural events or a combination thereof, in various embodiments. A scenario includes a triggering condition, such as the occurrence of multiple conditions during program execution. While these multiple conditions may vary, in some embodiments the conditions may relate to low progress indicators and/or other microarchitectural or structural details of actions occurring in execution resources 22, for example. The scenario may also define processor state data available for collection, reflecting the state of the processor at the time of the trigger. In various embodiments, scenarios may be hard-coded into a processor. In these embodiments, scenarios that are supported by a specific processor may be discovered via an identification instruction (e.g., the CPUID instruction in an Intel™ x86 instruction set architecture (ISA)).

A service routine is a per scenario function that is executed when a yield event occurs. As shown in FIG. 2, each channel may include a service routine segment 60 including the address of its associated service routine. A yield event is an architectural event that transfers execution of a currently running execution stream to a scenario's associated service routine. In various embodiments, a yield event occurs when a scenario's triggering condition is met. In various embodiments, the monitor may initiate execution of the service routine upon occurrence of the yield event. When the service routine finishes, the previously executing instruction stream resumes execution. The yield event request (YER) stored in YER segment 65 is a per channel bit indicating that the channel's associated scenario has triggered and that a yield event is pending. A channel's action bits stored in action segment 70 define the behavior of the channel when its associated scenario triggers. Finally, valid segment 75 may indicate the state of programming of the associated channel (i.e., whether the channel is programmed).

Still referring to FIG. 2, a yield indicator 52, also referred to herein as a yield block bit (YBB), is associated with channels 50a-50d. Yield indicator 52 may be a per software thread lock. When yield indicator 52 is set, all channels associated with that software thread are frozen. That is, when yield indicator 52 is set, associated channels cannot yield, nor can their associated scenario's triggering condition(s) be evaluated (e.g., counted).

Figure 3:
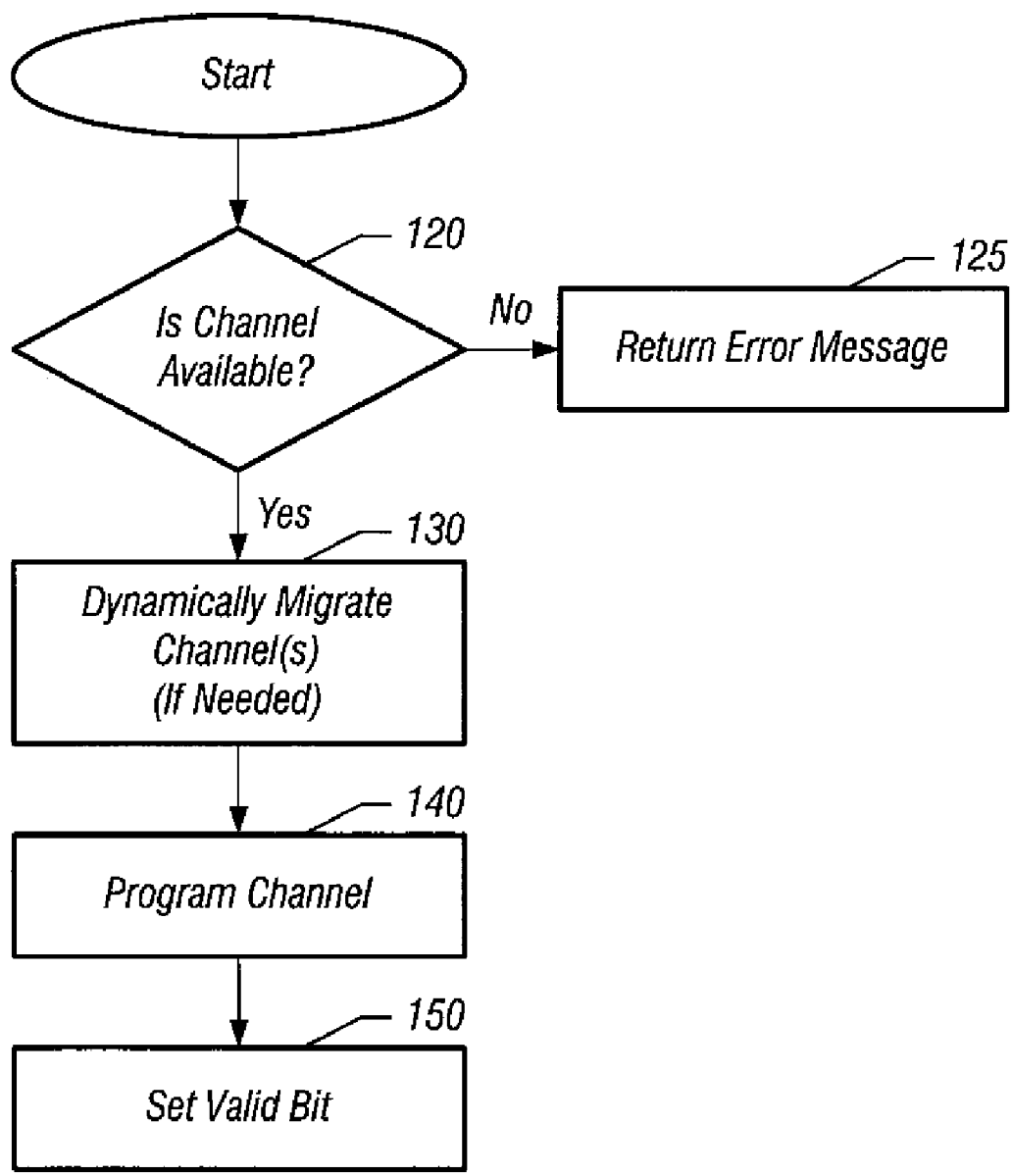
FIG. 3 is a flow diagram of a method in accordance with one embodiment of the present invention.

Referring now to FIG. 3, shown is a flow diagram of a method in accordance with one embodiment of the present invention. As shown in FIG. 3, method 100 may be used to program a channel in accordance with one embodiment of the present invention. As described above, in various embodiments a monitor may control channel operation, including programming of channels. As shown in FIG. 3, method 100 may begin by determining whether there is an available channel (block 120). In some embodiments, a channel is considered available when its valid bit is clear. In some implementations, a routine may be executed to read the valid bit on each channel. The number of channels present in a particular processor can be discovered via the CPUID instruction, for example. Table 1 below shows an example code sequence for finding an available channel in accordance with an embodiment of the present invention.

TABLE 1

```
int available_channel = -1;
for (int i=0; i<numChannels; i++)
{
    setup ECX;    // channel ID = i, match bit = 0,
                  // ring level = current ring level
    EREAD
    check ECX;
    if (valid bit == 0)
    {
        available_channel = i;
        i = numChannels;    // break out of for loop
        break;
    }
}
```

As shown in Table 1, first a register (i.e., ECX) may be set up and an instruction to read the current channel (i.e., EREAD) may be executed to determine whether the current channel is available. Specifically, if the valid bit of the current channel equals zero the current channel is available and accordingly, the routine of Table 1 is exited and the value of the available channel is returned. Note that by setting a match bit to zero, processor state information is not written during the routine Table 1.

Referring back to FIG. 3, if it is determined at diamond 120 that no channel is available, control may pass to block 125. There, if an available channel cannot be found, a message such as an error message may be returned to the entity trying to use the resource, in certain embodiments (block 125). If instead it is determined at diamond 120 that a channel is available, next control passes to block 130. There, one or more channels may be dynamically migrated, if necessary (block 130). In a multiple channel environment, one or more scenarios may be moved to a different channel depending on channel priorities, referred to herein as dynamic channel migration (DCM). Various embodiments of DCM will be discussed further below.

Still referring to FIG. 3, after any dynamic channel migration, the selected channel may be programmed (block 140). Programming a channel may cause various information to be stored in the channel that is selected for association with the requesting agent. For example, a software agent may request that a channel be programmed with a particular scenario. Furthermore, the agent may request that upon a yield event corresponding to the scenario a given service handler located at a particular address (stored in the channel) is to be executed. Additionally, one or more action bits may be stored in the channel.

Finally, upon programming a channel, the valid bit may be set to indicate that the channel has been programmed (block 150). In some implementations, the valid bit may be set during programming (e.g., via a single instruction that programs the channel and sets the valid bit). While described with this particular implementation in the embodiment of FIG. 3, it is to be understood that programming of one or more channels may be handled differently in other embodiments.

Dynamic channel migration allows scenarios to be moved from one channel to another when desired. Suppose a specific implementation supports two channels, a channel 0 and a channel 1, where channel 0 is the highest priority channel. Also, suppose that channel 0 is currently being used (i.e., its valid bit is set) and channel 1 is available (i.e., its valid bit is clear). If a monitor determines that a new scenario is to be programmed into the highest priority channel and that the new scenario will not cause any problems to the scenario currently programmed into the highest priority channel if it is moved to a lower priority channel, dynamic channel migration may occur. For example, scenario information currently programmed into channel 0 may be read and then that scenario information may be reprogrammed into channel 1.

Referring to the example code sequence shown in Table 2 below is an example dynamic channel migration from channel 0 to channel 1. Specifically, as shown in Table 2 an instruction (i.e., EREAD) is performed to read the channel 0 state. Next, a register storing the channel ID for the channel is modified. Specifically, the channel ID is modified and changed from a value of zero to a value of one. Then, an instruction (i.e., EMONITOR) is performed to program channel 1 with the scenario previously stored in channel 0. Accordingly, the information read from channel 0 is written into channel 1. Note that because it is known that channel 0 will be programmed with the new, higher priority scenario, in certain embodiments the valid bit of channel 0 need not be cleared.

TABLE 2

| | |
|---|---|
| setup ECX; | // channel 0, match bit = 0, |
| | //   ring level = current ring level |
| EREAD | // read channel 0 state |
| | // EAX, EBX, and ECX now contain the current |
| | //   state of channel 0 |
| modify ECX; | // change the channel ID to 1 |
| EMONITOR | // program channel 1 with scenario previously in channel 0 |

A dynamic instance of an executing instruction can potentially trigger yield events in multiple channels and in that case each event may be serviced. In various embodiments, the yield events may be serviced in channel priority order. While channel priority may take many different forms, in one embodiment priority may be based on channel order, i.e., a channel zero has a highest priority, a channel one has a next highest priority and so forth.

These channels may potentially be programmed by various uncoordinated software agents such as helper threads, profile-guided optimizations (PGOs), garbage collectors, and the like. Relying only on channel priority could possibly create problems at the application level, as certain software agents might change the state that will later become visible to other software agents. For example, if a helper thread-related scenario is programmed in a higher priority channel and is therefore serviced first, subsequent yield events are likely to be enabled, as will be described below. If at the same time there is a pending yield event on behalf of a PGO client, for example, a yield event will occur upon enabling by the helper thread client. The helper thread yield event handler thus handles the yield event, and not as expected by the PGO client.

The various agents that use the channels may be coordinated at the application level in run time via a monitor. Accordingly, in various embodiments the monitor manages which channel serves which agents so that the channel priority may match the priority assigned to each agent. Different manners of implementing dynamic channel migration to accomplish this task may be effected in different embodiments.

Figure 4:
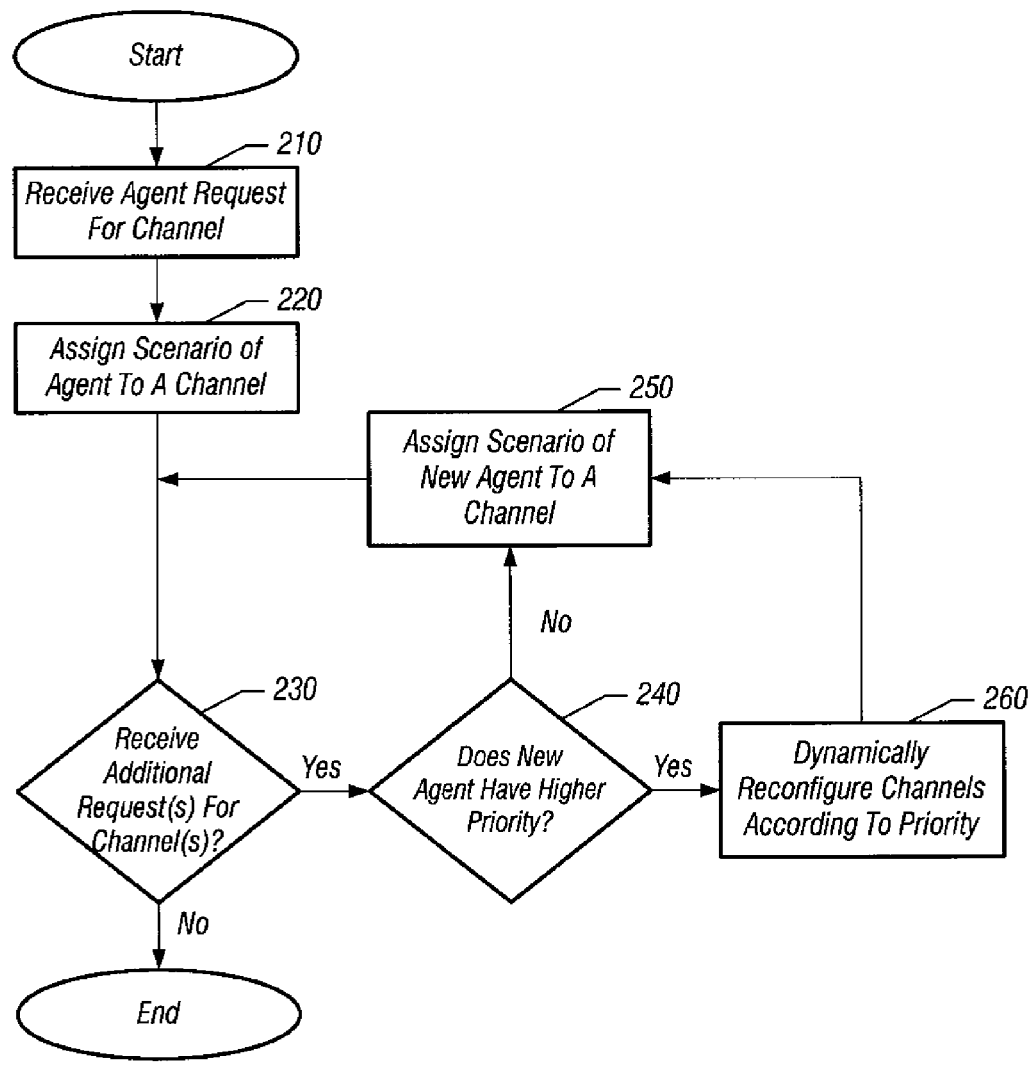
FIG. 4 is a flow diagram of a dynamic channel migration method in accordance with one embodiment of the present invention.

Referring now to FIG. 4, shown is a flow diagram of a dynamic channel migration method in accordance with one embodiment of the present invention. As shown in FIG. 4, method 200 may begin by receiving an agent's request for a channel (block 210). For example, different software agents may desire programming of a channel with various condition information, such as different performance count values, processor events or the like. In some embodiments, the agent request may be received by a monitor such as a supervisory application, for example, a resource manager.

Still referring to FIG. 4, the monitor or other processor resource may assign a scenario associated with the software agent to a given channel (block 220). As will be discussed further below, various manners of selecting an available channel may be implemented. On assignment, the channel may be programmed with the associated scenario. While not shown in FIG. 4, normal operation may resume after the programming. However, with reference to FIG. 4, after programming a first channel, immediately thereafter or at a later time, it may be determined whether one or more additional requests for a channel has been received (diamond 230). If not, method 200 ends and normal operation resumes.

If instead at diamond 230 it is determined that additional channel requests have been made, next it may be determined whether a new agent requesting the channel has a higher priority than the agent(s) previously assigned a channel(s) (diamond 240). This determination may also take into account the relative priority of the currently programmed channel(s) to the priority of one or more available channels.

If the new agent has a lower priority, a scenario requested by the lower priority new agent may be assigned to a lower priority channel and the channel may be programmed accordingly (block 250). If instead at diamond 240 it is determined that the new agent has a higher priority than the agent associated with the currently programmed channel, channels may be dynamically reconfigured according to the relative priority of the agents and the relative priority of the channels (block 260). Upon such dynamic reconfiguration, control to pass may pass to block 250 discussed above. If DCM is executed during a service routine, other service routines partially executed or pending may use the wrong channel ID when re-programming their channel. Accordingly, in general, DCM should not be executed during a service routine.

Dynamic channel migration may occur as follows in one embodiment: if a lower priority agent registers first with a monitor, it may receive the highest priority channel by default. If later, a higher priority agent requests a channel, the monitor may migrate the channel used by the lower priority agent to a lower priority channel, and provide the higher priority channel to the higher priority agent. By doing this, the monitor ensures that the higher priority agent will be serviced first, preventing the problem of a lower priority agent adversely affecting the state visible by the higher priority channel. However, in other embodiments, a currently programmed channel may be dynamically migrated to a higher priority channel when a new agent having a lower priority requests programming of a channel.

In various embodiments, a scenario may only be moved down in channel priority when the scenario will not suffer any harmful side effects by being moved. That is, the behavior of the scenario or its service routine programmed into the higher priority channel will normally determine how lower priority scenarios will be affected. For example, if a scenario will yield a different number of times or any data potentially collected by the scenario will be corrupted or changed by the change in channel priority, the scenario should not be moved.

As an example, if a higher priority channel's service routine unlocks the YBB lock (e.g., resets yield indicator 52 of FIG. 2) before exiting, a lower priority channel whose YER bit is set will yield immediately. If the lower priority channel's service routine collects processor state information, state information reflecting the state of the processor while it was executing the higher priority service routine is returned. In other words, the lower priority channel's service routine would be profiling the higher priority channel's service routine instead of the code it intended to profile.

Accordingly, in various embodiments priority of an agent may be determined based upon a type of service handler that is to be performed upon occurrence of a yield event for a scenario associated with an agent. Thus whether a service routine unlocks the YBB lock before exiting may aid in determining priority of a given software agent. However in other embodiments, different manners of assigning priority to agents (and thus channels) may be effected. For example, priority may be established by other attributes of service handlers, agents and even the type of scenario to be programmed into a channel.

In some embodiments, dynamic channel migration may use a best-fit strategy to map scenarios to channels. The algorithm shown below in Table 3 is one manner in which DCM may be implemented, although the scope of the present invention is not so limited. The behavior of a scenario's service routine with respect to releasing the YBB lock during its execution (before exiting) determines which channel it should use, in this embodiment.

TABLE 3

```
// Dynamic Channel Migration Algorithm
if (service routine releases YBB lock before return)
{
    find lowest priority, available channel (lpac)
    if (lpac == lowest priority channel)
        scenario->lpac      // program scenario into lpac
    else
    {
        for (each lower priority channel than lpac)
        {
            EREAD
            channel--
            EMONITOR   // move currently programmed
                       // scenario down one channel
        }
                       // program scenario into lowest
                       // priority channel
        scenario->lowest priority channel
    }
}
else     // service routine does not release YBB lock before
         return
{
    find highest priority, available channel (hpac)
    if (hpac == highest priority channel)
        scenario->hpac      // program scenario into hpac
    else
    {
        for (each higher priority channel than hpac)
        {
            EREAD
            Channel++
            EMONITOR   // move currently programmed
                       // scenario up one channel
        }
                       // program scenario into highest
                       // priority channel
        scenario->highest priority channel
    }
}
```

The example code sequence above thus programs a scenario requested by a lower priority agent into the lowest priority available channel and performs dynamic channel migration if necessary to do this. In contrast, if the agent requesting a channel allocation is to implement a service routine that does not release the YBB lock before returning, the scenario associated with such an agent is placed in the highest priority available channel, using dynamic channel migration if needed.

Referring now to FIG. 5, shown is an example channel allocation before and after DCM in accordance with an embodiment of the present invention. FIG. 5 illustrates the case where a client (e.g., a software agent) wants to program a scenario into an available channel using the algorithm of Table 3. As shown in FIG. 5, prior to DCM at a time instant 80, a highest priority channel 50a (i.e., channel 0) is programmed with a first scenario 55a. Specifically, scenario 55a includes a composite condition related to a cache miss (LFP-LLC miss, i.e., load fault-like predata ready-last level cache (LLC) miss). A second channel 50b (i.e., channel 1) having a lower priority is available at time instant 80. The service routine of the scenario to be programmed does not release the YBB lock and accordingly the agent requesting the scenario may be considered a higher priority agent than the agent associated with first scenario 55a. Since the highest priority channel is not available, DCM is used to migrate channels to free up the highest priority channel. Thus as shown in FIG. 5, at a time instant 82 after DCM first channel 50a is programmed with a new scenario 55b (LF-LLC miss-LBR, i.e., load fault-like (LLC) miss-last branch record) corresponding to a higher priority software agent, while original scenario 55a is now stored in second channel 50b having a lower priority.

Referring now to FIG. 6, shown is another example channel allocation before and after DCM in accordance with the algorithm of Table 3. FIG. 6 illustrates the case where a client (e.g., a software agent) wants to program a scenario into an available channel. As shown in FIG. 6, a plurality of channels 50a-50d are present. Prior to DCM at a time instant 84, a third channel 50c (i.e., channel 2) is programmed with a first scenario 55a (the LF-LLC miss-LBR scenario), while a fourth channel 50d (i.e., channel 3) is programmed with a second scenario 55b (IR-LBR, i.e., an instruction retired counter underflow). Accordingly, the two highest priority channels, namely a first channel 50a (i.e., channel 0) and a second channel 50b (i.e., channel 1) are available, and second scenario 55b is programmed into the lowest priority channel, namely fourth channel 50d. In the embodiment of FIG. 6, the service routine to be executed upon a yield event for the scenario to be programmed does release the YBB lock during its execution. First scenario 55a and second scenario 55b do not release the YBB lock. Since the lowest priority channel is not available, DCM is used to migrate channels to free up the lowest priority channel.

After DCM in accordance with an embodiment of the present invention at a time instant 86, first scenario 55a has been migrated to second channel 50b and second scenario 55b has been migrated to third channel 50c. Furthermore, a new, third scenario 55c has been stored in fourth channel 50d.

Note that when a scenario is programmed into the lowest priority channel, its service routine may collect data reflecting the state of the processor as it executes a service routine in a higher priority channel if both channels are triggered concurrently on the same instruction and the higher priority channel's service routine releases the YBB lock during its execution.

After the channels have been migrated, suppose the same instruction triggers the scenarios propagated in second channel 50*b* and fourth channel 50*d* concurrently. If the LF-LLC Miss-LBR service routine (executed on a yield event in second channel 50*b*) releases the YBB lock during its execution, the LFP-LLC Miss service routine (executed on a yield event in fourth channel 50*d*) is called immediately after a lock release instruction executes in the LF-LLC Miss-LBR service routine. If the LFP-LLC Miss service routine seeks to read the processor state, the processor state returned to it will describe the processor as it executes the LF-LLC Miss-LBR scenario, not the processor state in effect when both scenarios triggered. Thus according to some embodiments, scenarios programmed into lower priority channels may not be guaranteed to return processor state information in its service routine that reflects the processor state when the scenario was triggered. Accordingly, in some embodiments scenarios that do not affect other scenarios should be programmed into higher priority channels while scenarios that affect other scenarios should be programmed into the lowest priority channel to avoid affecting other scenarios. For example, scenarios associated with helper threads may be programmed into lower priority channels while scenarios associated with PGO's may be programmed into higher priority channels.

As yet another illustration of channel allocation in accordance with the algorithm of Table 3, assume a client requests programming of a scenario into an available channel, in which the least priority channel is available (at least). In such case, even if the scenario's service routine does release the YBB lock, because the lowest priority channel is available, DCM need not be used. Instead, the scenario may be programmed directly into the lowest priority channel.

Figure 7:
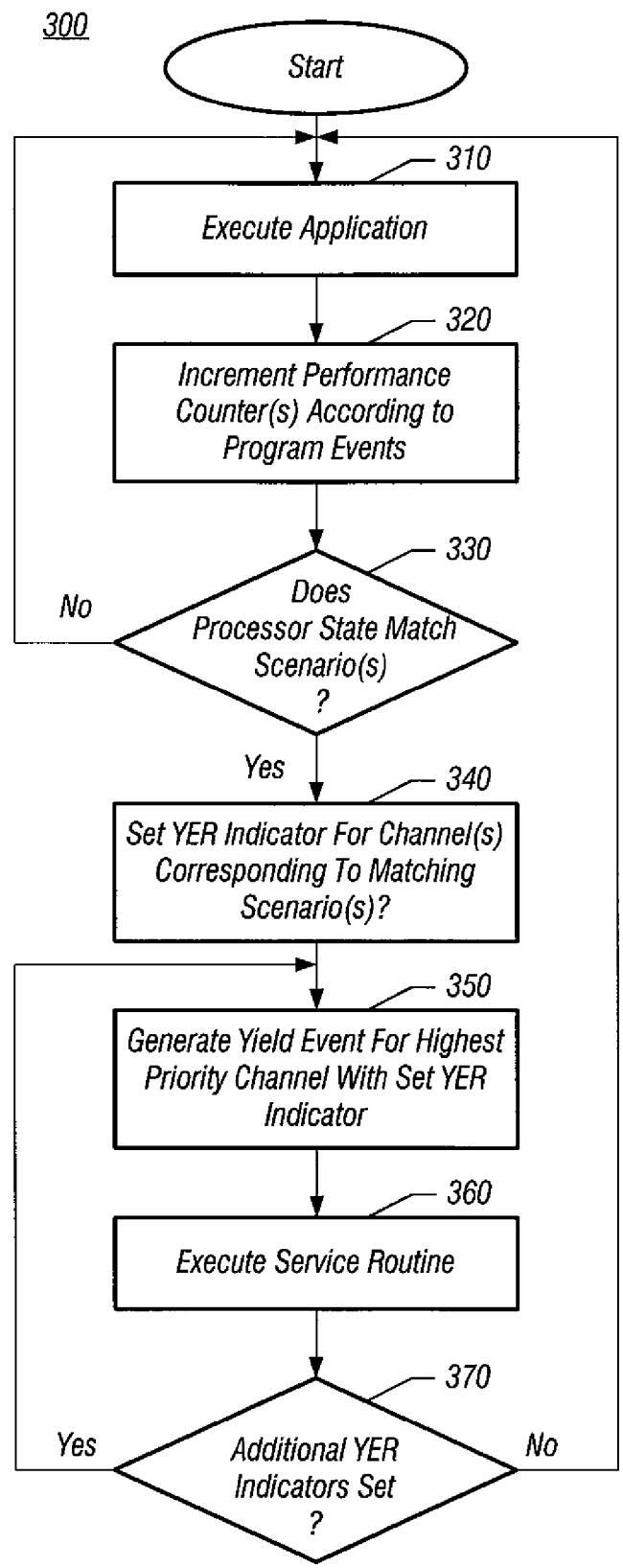
FIG. 7 is a flow diagram of a method for using programmed channels in accordance with an embodiment of the present invention.

Referring now to FIG. 7, shown is a flow diagram of a method for using programmed channels in accordance with an embodiment of the present invention. As shown in FIG. 7, method 300 may begin executing an application, for example a user application (block 310). During execution of the application, various actions are taken by the processor. At least some of these actions (and/or events) occurring in the processor may impact one or more performance counters or other such monitors within the processor. Accordingly, when such instructions occur that affect these counters or monitors, performance counter(s) may be incremented according to these program events (block 320). Next, it may be determined whether current processor state matches one or more scenarios (diamond 330). For example, a performance counter corresponding to cache misses may have its value compared to a selected value programmed in one or more scenarios in different channels. If the processor state does not match any scenarios, control passes back to block 310.

If instead at diamond 330 it is determined that processor state matches one or more scenarios, control passes to block 340. There, a yield event request (YER) indicator for the channel or channels corresponding to the matching scenario(s) may be set (block 340). The YER indicator may thus indicate that the associated scenario programmed into a channel has met its composite condition.

Accordingly, the processor may generate a yield event for the highest priority channel having its YER indicator set (block 350). This yield event transfers control to a service routine, namely a routine having its address programmed in the selected channel. Accordingly, next the service routine may be executed (block 360). Upon completion of the routine, it may be determined whether additional YER indicators are set (diamond 370). If not, control may pass back to block 310 discussed above. If instead additional YER indicators are set, control may pass from diamond 370 back to block 350, discussed above.

However, prior to calling the service routine, i.e., during a yield, the processor may push various values onto a user stack, where at least some of the values are to be accessed by the service routine(s). Specifically, in some embodiments the processor may push the current instruction pointer (EIP) onto the stack. Also, the processor may push control and status information such as a modified version of a condition code or conditional flags register (e.g., an EFLAGS register in an x86 environment) onto the stack. Still further the processor may push the channel ID of the yielding channel onto the stack.

In some embodiments, a service routine to service the one or more channels may execute generally according to the following high-level functions: discover the yielding channel; handle the opportunity; reprogram the channel (if necessary); and exit. To discover which channel yielded, the handler may pop the most recent value (i.e., the channel ID) off the stack. This value will map to the channel that yielded and may be used as the channel ID input for various actions or instructions during a service routine.

When a channel yields, its associated service routine is called and may accordingly handle the opportunity. Depending on the usage model, the service routine may execute code to take advantage of the current state of the processor (as defined by the scenario definition), collect some data, or read the channel state. Also upon yielding, the service routine may reprogram the channel depending on the scenario definition. For example, counting scenarios may be reprogrammed during a service routine.

To exit a service routine, various actions may occur. For example, the modified EFLAGS image pushed onto the stack during yield entry may be popped back into the EFLAGS register. Next, the EIP image pushed during the yield entry may be popped back into the EIP register. In such manner, the originally executing software thread may resume execution. Note that during exit operations, the channel ID pushed onto the stack at the beginning of the yield need not be popped off the stack. Instead, as discussed above, this stack value is popped during the service routine.

Implementations may be used in connection with architectures for use in managed run time applications and server applications, as examples. Embodiments of the present invention may be used to set and control priorities between servicing events that are triggered in multiple channels by one or more instructions. In such manner, events may be handled according to channel priority, which allows hardware implementation feasibility while satisfying software functionality.

Figure 8:
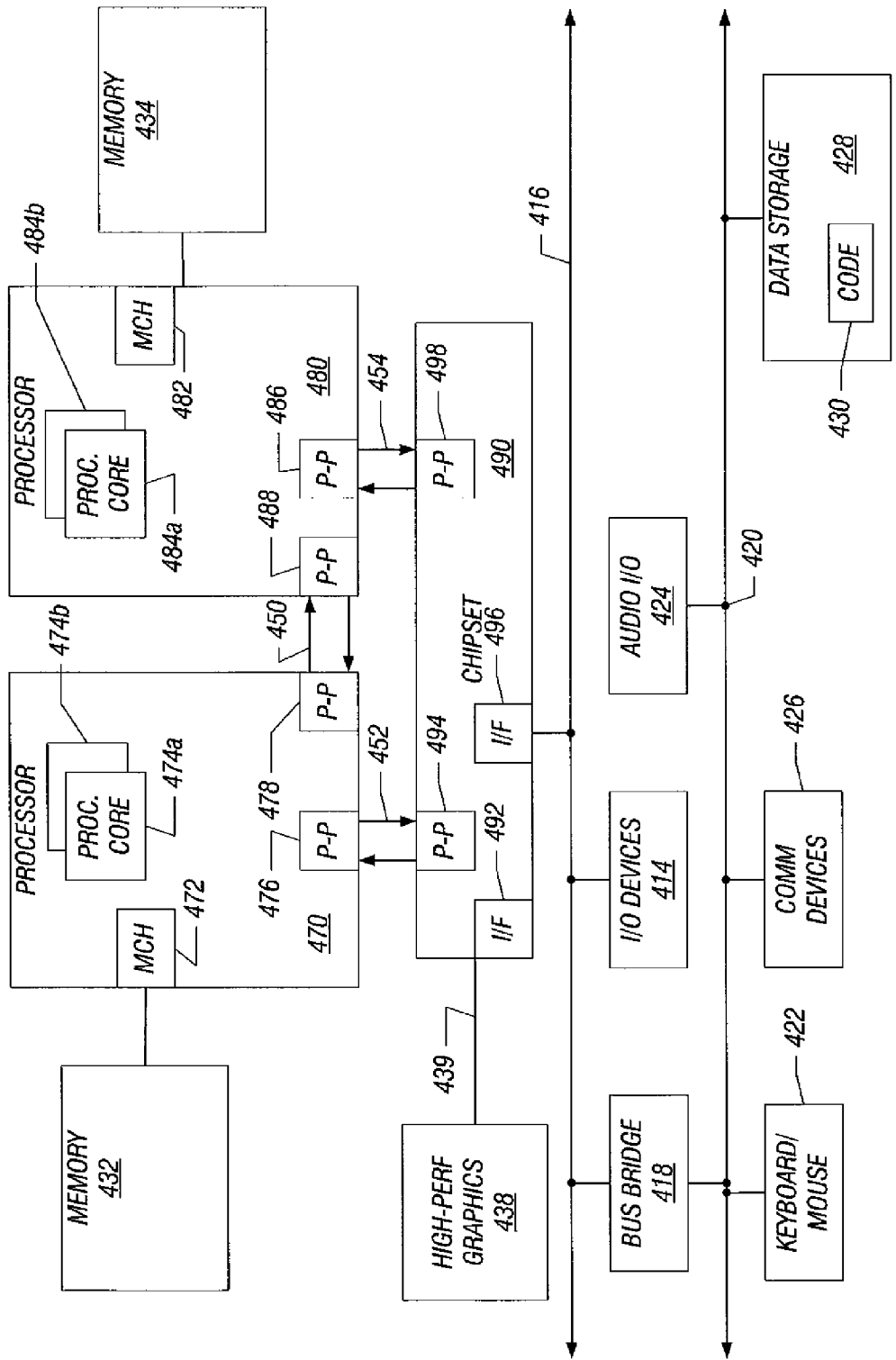
FIG. 8 is a block diagram of a multiprocessor system in accordance with an embodiment of the present invention.

Referring now to FIG. 8, shown is a block diagram of a multiprocessor system in accordance with an embodiment of the present invention. As shown in FIG. 8, the multiprocessor system is a point-to-point interconnect system, and includes a first processor 470 and a second processor 480 coupled via a point-to-point interconnect 450. As shown in FIG. 8, each of processors 470 and 480 may be multicore processors, including first and second processor cores (i.e., processor cores 474*a* and 474*b* and processor cores 484*a* and 484*b*). While not shown for ease of illustration, first processor 470 and second processor 480 (and more specifically the cores therein) may include multiple channels in accordance with an embodiment of the present invention. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 8, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interfaces 452 and 454, respectively. As shown in FIG. 8, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision 2.0*, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision 2.1*, dated June 1995 or a bus such as the PCI Express bus or another third generation I/O interconnect bus, although the scope of the present invention is not so limited.

As shown in FIG. 8, various input/output (I/O) devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a first relative priority between a first agent and a second agent; and
   assigning the first agent to a first channel of a processor having a first channel relative priority and having a first channel identifier corresponding to the first channel relative priority and to identify a sequence of service routine execution and assigning the second agent to a second channel of the processor having a second channel relative priority and having a second channel identifier corresponding to the second channel relative priority and to identify a sequence of service routine execution, according to the first relative priority and the first and second channel relative priorities, the assigning including dynamically migrating a first scenario associated with the second agent from the first channel to the second channel based on the first relative priority and the first and second channel relative priorities.

2. The method of claim 1, further comprising storing a scenario associated with the first agent in the first channel, wherein the first channel relative priority is higher than the second channel relative priority.

3. The method of claim 2, wherein storing the scenario comprises storing an address for a service routine associated with the scenario in the first channel, action bits to determine behavior of the first channel when the scenario triggers, and a program indicator.

4. The method of claim 3, further comprising storing a channel identifier corresponding to the second channel in a stack upon occurrence of a yield event of the scenario.

5. The method of claim 4, further comprising retrieving the channel identifier from the stack via a handler for the scenario.

6. The method of claim 1, further comprising:
   storing a first scenario associated with the first agent in the first channel and storing a second scenario associated with the second agent in the second channel; and
   handling the first scenario and the second scenario triggered via a single instruction according to the first and second channel relative priorities.

7. The method of claim 1, further comprising:
   executing an instruction that triggers a first scenario stored in the first channel and a second scenario stored in the second channel; and
   servicing the first scenario and the second scenario.

8. The method of claim 7, further comprising first servicing the one of the first scenario and the second scenario associated with the one of the first channel and the second channel having a higher relative priority.

9. The method of claim 1, further comprising discovering the first scenario using a user-level identification instruction.

10. An apparatus comprising:
    a first channel formed of a first storage of a processor to store a first composite condition corresponding to a first plurality of events or conditions that may occur during processor execution, the first channel having a first channel priority associated therewith;
    a second channel formed of a second storage of the processor to store a second composite condition corresponding to a second plurality of events or conditions that may occur during processor execution, the second channel having a second channel priority associated therewith; and
    a controller to select one of the first channel and the second channel to associate with a software agent based upon a mapping of a priority of the software agent to the first channel priority and the second channel priority, the software agent priority based on a type of handler to be executed when a composite condition occurs and wherein the controller is to dynamically migrate the first composite condition from the first channel to the second channel responsive to a channel request of a second software agent associated with a handler having a higher priority than a handler to execute on occurrence of the first composite condition.

11. The apparatus of claim 10, wherein the controller comprises a resource manager to select the one of the first channel and the second channel based upon a first handler and a second handler to be executed upon occurrence of the first and second composite conditions, respectively.

12. The apparatus of claim 11, wherein the first handler comprises an optimization routine and the second handler comprises a helper routine.

13. The apparatus of claim 10, further comprising a first handler located at an address stored in the first channel, the first handler including instructions to be performed upon occurrence of a yield event corresponding to the first composite condition.

14. The apparatus of claim 10, wherein the apparatus comprises a processor having a plurality of channels.

15. A system comprising:
a processor including:
one or more execution resources;
a first channel including a first storage to store first information associated with a first monitor, the first information to be stored pursuant to a request of a first agent and including a first composite condition that may occur during processor execution, an address for a handler to be executed upon occurrence of the first composite condition, and a yield indicator to indicate the occurrence;
a second channel including a second storage to store second information associated with a second monitor, the second information to be stored pursuant to a request of a second agent and including a second composite condition that may occur during processor execution, an address for a handler to be executed upon occurrence of the second composite condition, and a yield indicator to indicate the occurrence; and
a controller to dynamically migrate the first information from the first channel to the second channel when a new agent requests a channel allocation, based on a relative priority of the new agent and the first agent, the relative priority determined based on a type of handler to be executed upon occurrence of a corresponding composite condition; and
a dynamic random access memory (DRAM) coupled to the processor.

16. The system of claim 15, wherein the DRAM includes a user stack to store first channel information associated with the first channel after occurrence of the first composite condition.

17. The system of claim 16, wherein the first channel information includes a channel identifier for use by a service handler to be executed upon the occurrence of the first composite condition.

18. The system of claim 15, wherein the processor comprises a multiprocessor including a plurality of cores, each of the plurality of cores including a plurality of channels.

19. The system of claim 15, wherein the controller is to dynamically migrate the first information further based on priority of the first and second channels.

* * * * *